United States Patent Office 3,837,973
Patented Sept. 24, 1974

3,837,973
APPARATUS FOR CONTINUOUSLY PRODUCING CORRUGATED PLASTIC BOARD
Hiroshi Asakura, Kanagawa-ken, and Keisuke Sakai, Masaru Koyama, and Hironori Mizuguchi, Kamakura, Japan, assignors to Toyo Kagaku Kabushiki Kaisha, also known as Toyo Chemical Co., Ltd., Kamakura, Japan
Filed July 7, 1972, Ser. No. 269,887
Int. Cl. B32b 31/00
U.S. Cl. 156—470               6 Claims

ABSTRACT OF THE DISCLOSURE

A continuous plastic material shaping apparatus of the type in which a revolving drum having an undulating mold and suction orifices at its periphery against which a plastic material sheet to be shaped is brought to be fed and sucked by vacuum suction through the orifices connected with the interior of the drum which is kept under vacuum, the improvements being that on side edges of the periphery are provided flanges so arranged that the peripheral surface thereof may be on the same level as the convex crest of the undulations of the mold, with each flange having slot or groove therearound with orifices therein, through which orifices vacuum suction is effected. By means of the improved apparatus plastic materials to be shaped are sealingly retained on the peripheral surface of the mold and on the flanges so that a vacuum molding process may be carried out without vacuum leakage.

BACKGROUND OF THE INVENTION

Field of the Invention

This invention relates to apparatus for continuously producing a single or double faced corrugated board of plastic materials by way of extrusion, vacuum and laminating molding processes.

Prior Art

Heretofore, apparatus for continuously shaping plastic materials has been known, for example in U.S. Pat. No. 3,314,110. The apparatus comprises, in combination, a revolving drum and a mold mounted on the periphery of the drum, said drum and mold being formed with a plurality of suction orifices associated with changeover valves for connecting the orifices with the interior of the drum which is kept under suction.

According to such machine, however, there occurs a loss of suction force since air sucked laterally through spaces between the material fed to the drum and the undulating mold causes a substantial decrease in the suction force. During the suction operation, the side end portions of the materials are being pulled inwardly and as a result of which, irregular products in width are formed. It also happens that the materials on the mold slip off and do not align with the drum.

OBJECTS AND SUMMARY OF THE INVENTION

This invention relates to an apparatus for preparing a "single or double faced corrugated board" of plastic materials, especially of thermoplastic resin by way of extrusion, vacuum and laminating molding processes.

A "single or double faced corrugated board" referred to generally indicates a laminated paper board in which a flat sheet is laminated on one side or both sides of a corrugated sheet, whereas in the present invention a thermoplastic resin sheet is used instead of paper sheet. Accordingly, a laminated board of plastic material is hereinafter referred to as "corrugated plastic board." Thermoplastic resin for use in this invention includes polystyrene, polyethylene, polypropylene and the like.

Briefly explaining the molding processes according to the present invention, the resin is melted by heating in a conventional manner and extruded continously through a die to form a flat sheet. Shortly after extrusion, the sheet is fed to a revolving drum at a first predetermined position with the sheet pressed by a roll. The drum has an undulating mold around its periphery and in the valleys or troughs of which undulations there are provided a plurality of orifices spaced with short intervals therebetween. When the sheet of plastic material arrives at a second predetermined position as the drum rotates, a vacuum chamber in the center of the drum is communicated with partition chambers installed parallel to the axis of the drum, along the peripheral surface of the drum and radially outward of the vacuum chamber, whereby the heat retaining sheet fed to the drum is subjected to vacuum suction through the orifices to be intimately contacted against the mold and hence it is molded to form exact undulations. It should be noted that term "corrugated sheet" hereinafter described refers to a sheet already shaped in the undulating form. Similarly, "forming sheet" refers to a sheet to be shaped in such form. In connection therewith the term "flute" means a board formed by an additional lamination effected on one side or both sides of a corrugated sheet.

Plastic materials derived from the same source are extruded through another die to shape a liner or flat sheet, which is, after the corrugated sheet is vacuum-molded, fed to the revolving drum with the sheet pressed by a roll. The liner sheet retaining heat is pressed and adhered on each convex crest of the undulations aligned laterally in rows in a corrugated sheet.

Depending on the rigidity of the plastic materials the liner sheet to be laminated on the corrugated sheet may be controlled in width so as to form a corrugated laminate either with or without hollow air-tight cells therein.

The drum continuously rotates, carrying the laminate on the surface of the mold by vacuum suction. At the second predetermined position, the single faced corrugated plastic board is peeled off from the drum, if necessary, by blowing a pressurized air through the orifices. The peeling off is effected such that the vacuum chamber arranged in the center of the drum may be changed over to a pressure chamber adjacent to the vacuum chamber. Coincidentally, the pressure chamber is communicated with the partition chambers. The pressure chamber is kept under atmospheric or superatmospheric pressure. The change-over is made at two positions, i.e. where the flat sheet is initially introduced to the drum, that is, open-corrugated sheet is peeled off from the drum, that is, open-shut valves fixed on connection pipes which communicate the partition chambers with the pressure or vacuum chamber are actuated at said positions by electrical or mechanical means. Details will be made clear hereinafter.

A single faced laminated board is peeled off and transferred onto a roll, if desired, a further liner or flat sheet extruded through another die is adhered or cemented on the opposite surface of the laminate during the proceeding of the drum. In either case, the liner sheet is pressed by press-rolls to the crests of the undulations of the corrugated sheet. Hence, it is necessary that the corrugated sheet have pressure resistance so as not to be crushed or broken.

As described above, a plurality of air-tight cells are formed in a single faced laminate board in case the laminate board is not sufficiently rigid to be further laminated. The formation of such cells enables the liner sheet to be applied to the single faced laminate board without crushing or breaking, which, in this sense, is one of the features of the present invention.

In accordance with the present invention, there is provided an apparatus for continuously producing a corrugated plastic board comprising extruders for extruding melted plastic materials through dies to form a flat sheet, a revolving drum having an undulating mold at its periphery, each of said orifices being connected with the interior of the drum through open-shut valves which are so changed over as to be communicated with a vacuum or pressure chamber in the drum, and press rolls for co-operating with said drum to press a flat sheet on the mold characterized in that on the side edges of the periphery are provided flanges so arranged that the peripheral surface thereof may be on the same level as the convex crests of the undulations of the mold, with each flange having a slot or groove therearound having orifices and these orifices are connected with the interior of the drum through said open-shut valves.

In order to perform with certainty this object there are provided, as one embodiment of the present invention, means for automatically feeding small bars, which can be easily removed, in each of the concave valleys or troughs of the undulations of the flute.

In another embodiment of the present invention, there are also provided means for adhering a linear sheet to a single faced laminate board which comprises interlocking, with the single faced laminates, a hollow roll having at its periphery cogs adaptable to each undulation of the corrugated sheet in said board and having an adhesive feeding slot in the spaces between the cogs to apply adhesives only to the convex crests of the undulations of the corrugated sheet, and rotating said roll to co-operate with the progressing board. The products thus obtained are "double faced corrugated plastic board" of the present invention.

In the field of vacuum molding technique, the prior art has encountered substantial vacuum leakage during operation which has resulted in the production of irregular products in their shape. In this invention, these drawbacks are fully avoided.

In accordance with the present invention, the vacuum molding process is effectively accomplished without vacuum leakage since the forming sheet fed to the drum is sealingly retained on the peripheral surface of the mold and on the flanges. To be more specific, the peripheral surface of the flanges is on the same level as the convex crests of the undulations of a mold such that when the forming sheet wide enough to extend over the flanges is fed to the drum, the forming sheet is contacted on the peripheral surface of the flanges and the crests of the undulated mold under suction so as to form an air-tight space enclosed by the concave valleys of the mold undulation and flanges. Subsequently, the corrugated sheet is vacuum-molded and carried on forwardly retained sealingly by the mold and flanges.

As is clear from the above, vacuum leakage is prevented by the provision of flanges on the side edges of the peripheral surface of the drum, without which air sucked through a side end space between the corrugate forming sheet and the mold would cause a considerable decrease in suction force. Furthermore, during vacuum molding, the side end portions of the forming sheet over the flanges are sucked against the surface of the flanges by the suction force through orifices in the slots provided in the flanges so that the side end portions of the sheet are prevented from being pulled inwardly toward the mold thus enabling the formation of a uniformly wide corrugated sheet along the entire length of the sheet.

As set forth above, if desired, the formation of a single faced laminate board is allowed to co-operate with the subsequent laminating process. The cells render not only the further laminate process to be carried out without crushing or breaking of the laminate during operation but also a highly resilient product which is strong against shock due to the air cushion, to be obtained.

BRIEF DESCRIPTION OF THE DRAWINGS

The present invention is illustrated with reference to the drawing in which.

DETAILED DESCRIPTION OF THE EMBODIMENT

Figure 1:
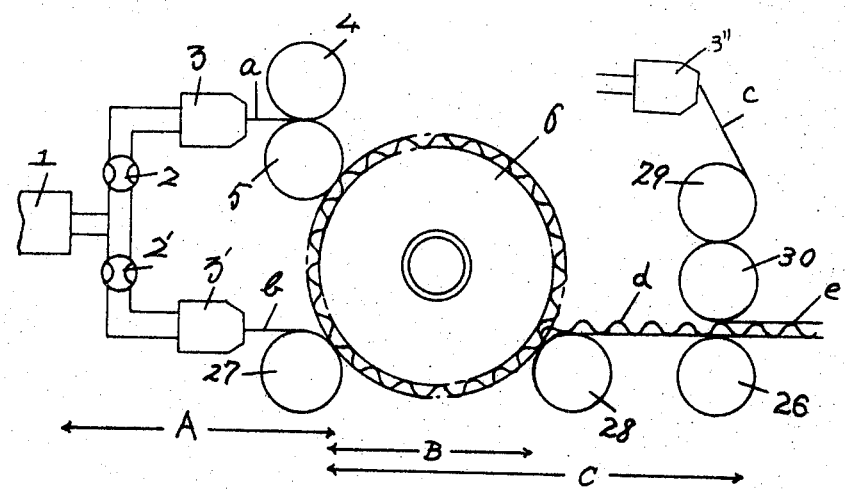
FIG. 1 is a schematic view illustrating an outline of the present invention.

In FIG. 1, arrow A shows an extrusion molding process, arrow B a vacuum molding process and arrow C a laminate molding process respectively. The method of the present invention is accomplished by the extrusion molding process A in which a forming sheet $a$ and a liner sheet $b$ are continuously extruded. In the vacuum molding process B, the extruded forming sheet $a$ is exactly shaped into undulating form and then the liner sheet $b$ is laminated on one side of the corrugated sheet, and in the subsequent laminate molding process C the opposite surface of the single faced corrugated sheet board has another liner sheet $c$ laminated thereon.

In FIG. 1, numeral 1 denotes a turn head of an extruder, numerals 2 and 2' flow regulators for controlling melted thermoplastic resin flow from turn head 1, and numerals 3 and 3' dies for forming plastic sheet, the die 3 being utilized for the forming sheet $a$ and the die 3 for the liner or flat sheet $b$ respectively. A sheet $a$ extruded from die 3 is shaped into a sheet having the width necessary for vacuum molding by nipple rolls 4 and 5 with the sheet $a$ heated to the optimum temperature. The forming sheet $a$ as shaped in process A is transferred to the vacuum molding process B to provide continuous undulations in the sheet.

Figure 4:
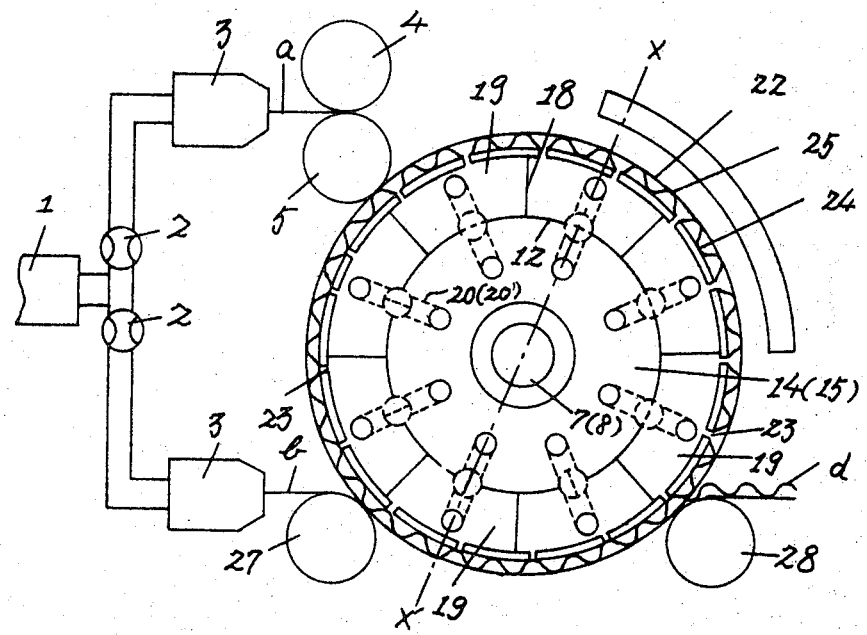
FIG. 4 is a side view illustrating a revolving drum of the present invention.
Figure 5:
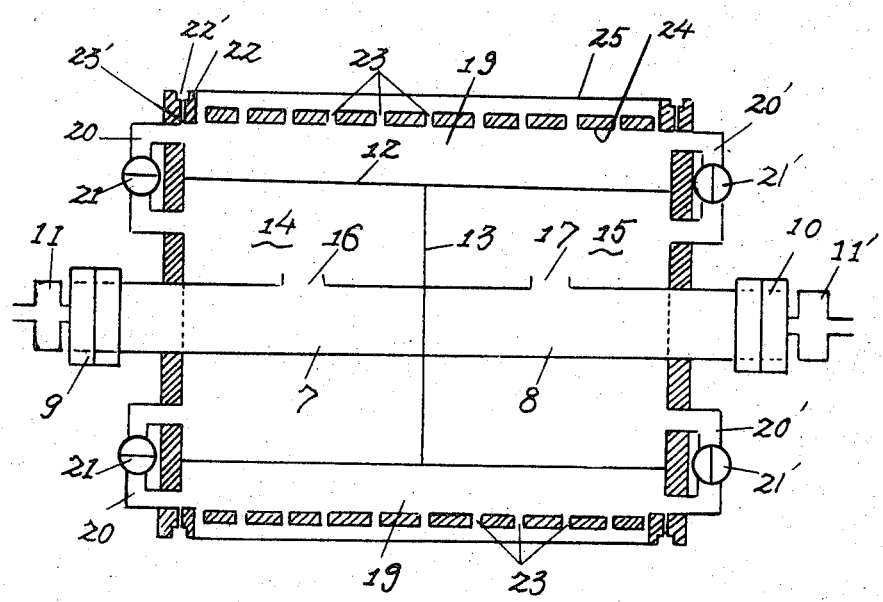
FIG. 5 is a view of the revolving drum taken along line X–X' of FIG. 4.
Figure 6:
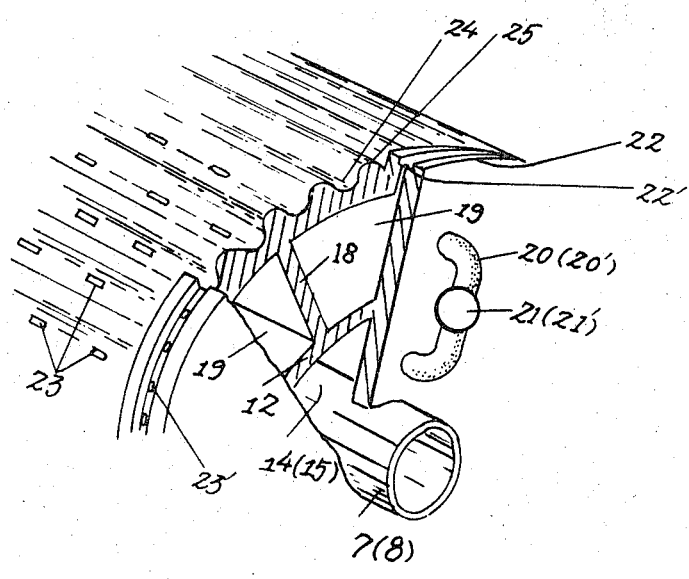
FIG. 6 is a fragmentary view in perspective illustrating the drum with parts broken away.

Numeral 6 indicates a hollow revolving drum which constitutes the main part of the vacuum molding process B, and FIGS. 4 to 6 illustrate the details thereof.

Referring to FIG. 5, numerals 7 and 8 designate a shaft fastened in the center of the drum 6, the shaft being a hollow pipe with the middle thereof being intercepted to constitute two partitions inside the shaft. The shaft defines the axis rotation of the drum. Bearing 9 connects the shaft 7 to rotary joint 11 and is sealingly communicated to a pressure source (not shown). The pressure source is usually allowed to open to atmosphere, but, if necessary compressed air may be supplied. Thus, atmospheric or superatmospheric pressure is fed to a pressure chamber 14 via bearing 9, hollow shaft 7 and opening 16. A bearing 10 connects the hollow shaft 8 to rotary joint 11', with the bearing being communicated to suction source (not shown). Thus, suction force effects a vacuum chamber 15 through bearing 10 by way of hollow shaft 8 and opening 17. The two chambers, namely pressure chamber 14 and vacuum chamber 15, are defined by a peripheral wall 12 and a partition wall 13.

Referring to FIG. 6, partition chambers 19 are provided by dividing the space between the peripheral wall 12 and the outer peripheral wall of the drum radially and parallel to the axis of the drum by partition walls 18. The partition walls 18 and the partition chambers 19 are fully illustrated in FIG. 4. As shown in FIGS. 4 and 5, a plurality of connection pipes 20 and 20' fixed on the both end surfaces of the drum 6 communicate the partition chambers 19 with pressure chamber 14 and vacuum chamber 15. Open-shut valves 21 and 21' positioned on the connection pipes 20 and 20' actuate conversely to each other, that is, when a forming sheet a is fed to the mold on the drum, valve 21' is opened while valve 21 is closed. On the other hand, when a single faced laminated plastic board d is peeled off from the drum, valve 21 is opened simultaneously with valve 21' being closed.

As stated above, these actions are effected by electrical means or mechanical contact and hence, partition chambers 19 are communicated or intercepted with vacuum chamber 15 or pressure chamber 14 such that vacuum molding and peeling off of the plastic board are simultaneously carried out.

As shown in FIG. 4–6, flanges 22 are so arranged that the peripheral surface of the flanges 22 may be on the same level as a crest 25 of the undulations of the mold. In valleys 24 of the undulating mold, there are provided a plurality of orifices 23 which are spaced at appropriate intervals. At the peripheries of the flanges 22, there are provided narrow slots or grooves 22' in the base of which a plurality of orifices 23' are formed. If desired, a plurality of means for cooling a hot plastic board, such as orifices through which cooled air is blown, may be provided on the sloping surface of the undulating mold although these additional devices are usually unnecessary. These orifices also bring about effective peeling off of a single faced laminate board from the drum. It is preferred that the mold may be detached from the drum and may be made of rubber and steel. Thus, molds varying in shape may be selected in accordance with one's purpose. It is also preferred that the partition chambers 19 on which the mold is mounted may be detached from the pressure and vacuum chambers. Furthermore, the drum itself may be changed for another.

When process A advances on to process B in FIG. 1, the forming sheet a wide enough to extend over flanges 22 is fed to the drum 6 pressed by nipple roll 5 so as to be contacted on the convex crests 25 of the mold and peripheries of the flanges 22. Particularly, as the forming sheet a covers the peripheral surface of the flanges, there occurs no vacuum leakage. Furthermore, side end portions of the forming sheet a over the flanges 22 are sucked against the peripheral surface of the flange under suction force through orifices 23' in the slots 22' during vacuum molding. Thus, the side end portions of the forming sheet a are prevented from being pulled inwardly toward the mold. As a result, a corrugated sheet having a completely undulating configuration and uniform width along the entire length thereof can be prepared.

Where the liner or flat sheet b as wide as the forming sheet a is fed to the revolving drum 6 under pressure of a nipple roll 27 a single faced laminate board d having a plurality of completely air-tight cells laterally extending between undulations, is made, so there would be no crushing or breaking of the laminate d in making a double-faced laminate board e. It should be noted, however, that a liner sheet b of less width than the forming sheet a may be fed to the drum 6, and in such case, air-tight cells are not formed in a laminate board d. Depending upon the rigidity and thickness of the plastic materials, it may be possible to make a double faced plastic board e without forming airtight hollow cells in a single faced laminate board d.

A single laminate board d via the vacuum molding process B is transferred to the subsequent laminate process C by a roll 28, and then a liner sheet c extruded through die 3" and rolled by press-rolls 29 and 30 is laminated on the opposite surface of the laminate board d to produce a double faced laminate board e.

Figure 3:
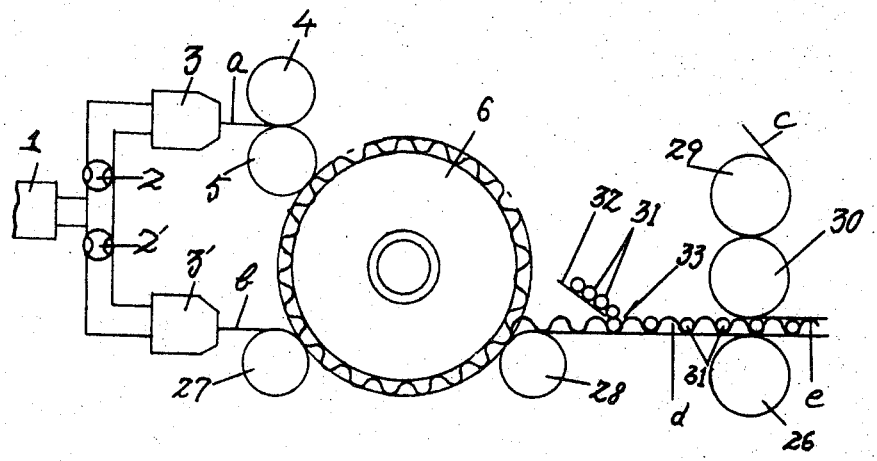
FIG. 3 schematically illustrates another embodiment of the present invention in which an adhesive applying device is additionally provided for an apparatus shown in FIG. 1.

Referring to FIG. 3, additional means for the prevention of crushing of the single faced laminate board d is provided. As stated above, this means is not an indispensable constituent for this invention, but merely one embodiment of the present invention.

A plurality of small bars 31 on plates 32 and 33 are rolled down between adjacent crests of the undulations of the single faced laminate board d. The diameter of the small bars 31 is such that when the roller is adapted to the laminate d, the uppermost surface of the bar 31 may be on the same level as the crests of the undulations of the laminate d. Then a liner sheet c is fed to the laminate d pressed by the press-rolls 26, 30 to thereby form a double faced corrugated plastic board e without crushing.

Figure 2:
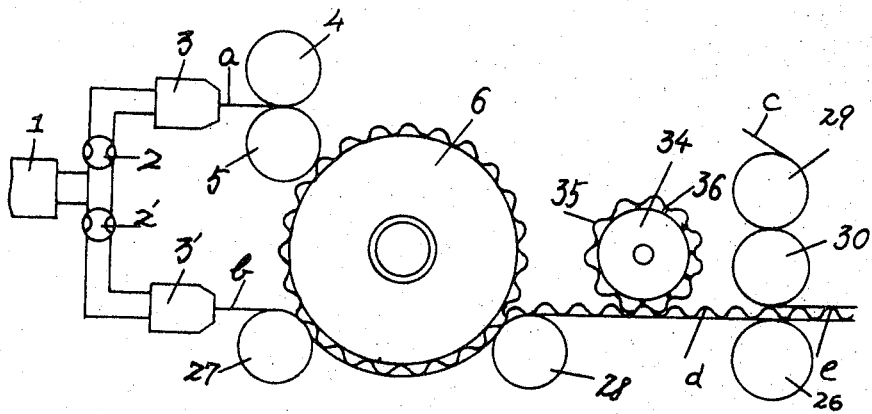
FIG. 2 is a schematic view illustrating one embodiment of the present invention wherein means for automatically feeding small bars to prevent the flute of a laminated plastic board from crushing or breaking is combined with the apparatus shown in FIG. 1.

Referring to FIG. 2, a hollow roll 34 having cogs or teeth 35 at its periphery is provided, with the cogs being adaptable to the undulations of the corrugated sheet in a single faced laminated board d. The cogs 35 have narrow slots 36 in the troughs through which adhesives contained in the roll 34 are applied to each crest of the corrugated sheet in the laminate d. The rotating speed of the roll 34 is made to co-operate with the progressing speed of the single faced laminate board d. Similarly, the liner sheet c is applied to the laminate d and then the sheet c is adhered to the laminate d to produce a double faced laminate board e.

It should be understood that such hollow roll 34 is provided when the sheet c is not suitably adhered or secured to the laminate d by heating.

What we claim is:

1. An apparatus for continuously producing a corrugated plastic board of the type comprising extruders for extruding melted plastic materials through dies to form a flat sheet, a rotatable drum, the drum having vacuum and pressure chambers therein and an undulating mold at its periphery, a plurality of orifices being formed with the mold and the periphery, open-shut valves through which each of said orifices is connected with the interior of the drum, the open-shut valves being changed over so as to be communicated with the vacuum or pressure chamber in the drum, and press rolls co-operating with said drum to press a flat sheet on the mold, the improvement being that the drum periphery has side edges provided with flanges arranged so that the peripheral surface thereof is on the same level as the convex crests of the undulating mold, each flange having an unobstructed groove therearound, the base of the groove being provided with orifices and the last named orifices being connected with the interior of the drum through said open-shut valves.

2. The apparatus according to claim 1 further including a press roll by which a liner sheet is pressed on a single faced laminate board to form a double faced laminated board.

3. An apparatus for continuously producing a corrugated plastic board of the type comprising extruders for extruding melted plastic materials through dies to form a flat sheet, a rotatable drum, the drum having vacuum and pressure chambers therein and an undulating mold at its periphery, a plurality of orifices being formed with the mold and the periphery, open-shut valves through which each of said orifices is connected with the interior of the drum, the open-shut valves being changed over so as to be communicated with the vacuum or pressure chamber in the drum, and press rolls for co-operating with said drum to press a flat sheet on the mold, the improvement being that the drum periphery has side edges provided with flanges arranged so that the peripheral surface thereof is on the same level as the convex crests of the undulating mold, each flange having a groove therearound provided with orifices and the last named orifices being connected with the interior of the drum through said open-shut valves, said vacuum and pressure chambers being of integral cylindrical constructions divided by a partition wall and surrounded by a peripheral wall, in the center of the chambers a hollow shaft is provided with the middle of the shaft being intercepted by said partition wall, said shaft having two openings, one of the openings communicating said shaft with said vacuum chamber and the other opening with the pressure chamber, and the space between a peripheral wall of the chambers and the drum periphery being divided radially and parallel to the axis of the drum by partition walls thus forming a plurality of partition chambers inside the drum, said orifices of mold and the grooves being communicated with said partition chambers, whereby when a suction operation is effected through said partition chambers, a corrugate forming sheet is sucked against the mold and flanges without vacuum leakage and is carried forward without slippage.

4. The apparatus according to claim 3 wherein a plurality of connection pipes are provided for communicating said vacuum or pressure chamber with the hollow shaft, the open-shut valves being fixed on said connection pipes and the open-shut valves being so activated that at a position where the forming sheet is initially introduced to the drum, the partition chamber may be communicated with the vacuum chamber, while at a position where the single faced laminate board is peeled off from the drum, the partition chamber may be communicated with the pressure chamber.

5. An apparatus for continuously producing a corrugated plastic board of the type comprising extruders for extruding melted plastic materials through dies to form a flat sheet, a rotatable drum, the drum having vacuum and pressure chambers therein and, an undulating mold at its periphery, a plurality of orifices being formed with the mold and the periphery, open-shut valves through which each of said orifices is connected with the interior of the drum, the open-shut valves being changed over so as to be communicated with the vacuum or pressure chamber in the drum and press rolls co-operating with said drum to press a flat sheet on the mold, the improvement being that the drum periphery has side edges provided flanges arranged so that the peripheral surface thereof is on the same level as the convex crests of the undulating mold, each flange having a groove therearound provided with orifices, the last named orifices being connected with the interior of the drum through said open-shut valves and a hollow adhesive applying roll having at its periphery cogs adaptable to the undulations in the single-faced laminate board, the cogs having adhesive feeding slots to apply adhesives only to the crests of said undulations, whereby a liner sheet can be adhered on the single faced laminate board under pressure of a press-roll to thereby form a double faced laminate board.

6. The apparatus for continuously producing a corrugated plastic board according to claim 5 further including means for automatically feeding small bars between each of adjacent undulations in a single faced laminate board, the diameter of each bar being such that when the bars are adapted to the laminate board the uppermost surface of the bars are on the same plane as the crests of said undulations whereby a liner sheet can be laminated on the single faced laminate board without crushing or breaking under pressure of the press-roll to thereby form a double faced laminate board.

References Cited

UNITED STATES PATENTS

| | | | |
|---|---|---|---|
| 3,314,110 | 4/1967 | Missbach | 425—388 |
| 2,902,718 | 9/1959 | Martelli et al. | 156—189 UX |
| 3,609,724 | 9/1971 | Allison et al. | 226—95 X |
| 3,682,736 | 8/1972 | Akamatsu | 156—470 X |
| 3,226,458 | 12/1965 | Graff et al. | 264—90 |
| 3,027,596 | 4/1962 | Knowles | 425—388 X |
| 3,594,868 | 7/1971 | Winstead | 425—388 |
| 3,518,725 | 7/1970 | Donofrio | 425—388 |
| 3,142,599 | 7/1964 | Chavannes | 156—210 |

DOUGLAS J. DRUMMOND, Primary Examiner

D. A. SIMMONS, Assistant Examiner

U.S. Cl. X.R.

156—285, 473, 500; 425—388